United States Patent
Stephens et al.

(10) Patent No.: US 7,774,389 B2
(45) Date of Patent: Aug. 10, 2010

(54) OPTIMIZED GARBAGE COLLECTION TECHNIQUES

(75) Inventors: Maoni Z. Stephens, Sammamish, WA (US); Patrick H. Dussud, Redmond, WA (US); Peter F. Sollich, Munich (DE); Claudio Caldato, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 256 days.

(21) Appl. No.: 11/654,082

(22) Filed: Jan. 17, 2007

(65) Prior Publication Data

US 2008/0172431 A1    Jul. 17, 2008

(51) Int. Cl.
*G06F 17/30* (2006.01)

(52) U.S. Cl. .................................... 707/813; 717/151

(58) Field of Classification Search ............... 707/206; 717/2, 153
See application file for complete search history.

(56) References Cited

U.S. PATENT DOCUMENTS

| | | | |
|---|---|---|---|
| 6,098,089 A | 8/2000 | O'Connor et al. | |
| 6,308,315 B1* | 10/2001 | Dice et al. ................. | 717/106 |
| 6,349,314 B1 | 2/2002 | Patel | |
| 6,446,257 B1 | 9/2002 | Pradhan et al. | |
| 6,473,773 B1 | 10/2002 | Cheng et al. | |
| 6,484,188 B1 | 11/2002 | Kwong et al. | |
| 6,560,619 B1 | 5/2003 | Flood et al. | |
| 6,748,503 B1 | 6/2004 | Morrison | |
| 6,865,585 B1* | 3/2005 | Dussud ...................... | 707/206 |
| 6,898,602 B2 | 5/2005 | Sayag | |
| 6,898,611 B1 | 5/2005 | Dussud et al. | |
| 6,993,770 B1 | 1/2006 | Detlefs et al. | |
| 7,114,045 B1* | 9/2006 | Pliss et al. ................... | 711/159 |
| 7,167,881 B2* | 1/2007 | Yasuda et al. ............... | 707/206 |
| 7,216,137 B2* | 5/2007 | Shpeisman et al. ......... | 707/206 |
| 7,287,049 B1* | 10/2007 | Printezis et al. ............ | 707/206 |
| 7,434,214 B2* | 10/2008 | Jamison ..................... | 717/153 |
| 2004/0248612 A1* | 12/2004 | Lee et al. ................. | 455/550.1 |
| 2007/0033240 A1* | 2/2007 | Barsness et al. ............ | 707/206 |
| 2008/0215649 A1* | 9/2008 | Fink et al. .................. | 707/206 |

OTHER PUBLICATIONS

Boehm et al., "Transparent Garbage Collection for C++", Date: Feb. 2006, http:// www.open-std.org/JTC1/SC22/WG21/docs/papers/2006/n1943.pdf.
Hertz et al., "Error-Free Garbage Collection Traces: How to Cheat and Not Get Caught", Date: 2002, ACM Press, New York, US, pp. 140-151, http://delivery.acm.org/10.1145/520000/511352/p140-hertz.pdf? key1=511352&key2=0813082611&coll=GUIDE&dl=GUIDE&CFID=5328771&CFTOKEN=88543852.

(Continued)

*Primary Examiner*—Debbie Le

(57) ABSTRACT

Various technologies and techniques are disclosed for providing optimized garbage collection. A garbage collector is provided for managing a garbage collection process. An optimized garbage collection feature is provided that allows the garbage collection process to be suggested. When the optimized garbage collection feature is invoked at a particular moment, the system determines if collection is appropriate at the particular moment. If collection is determined to be appropriate at the particular moment, then the system performs the garbage collection process. If collection is determined to not be appropriate at the particular moment, then the system delays garbage collection until an appropriate time. A low latency mode can be used to automatically ensure that the garbage collection process starts sooner than it would in a normal mode. The latency mode in use can be changed at different points in time during the garbage collection process.

20 Claims, 8 Drawing Sheets

OTHER PUBLICATIONS

Kempf; William E., "A garbage collection framework for C++", Date: Jan. 2001, http://www.codeproject.com/cpp/garbage_collect.asp?print=true.

Richter, Jeffrey, "Garbage Collection: Automatic Memory Management in the Microsoft NET Framework", Date: Nov. 2000, http://msdn.microsoft.com/msdnmag/issues/1100/GCI/.

* cited by examiner

OPTIMIZED GARBAGE COLLECTION TECHNIQUES

BACKGROUND

In the world of computer science, garbage collection (GC) is used to reclaim memory that is used by objects that will never again be accessed by one or more applications. Garbage collectors are programs that manage this garbage collection process. Many framework environments, such as MICROSOFT®.NET Framework, Java, and other frameworks have a garbage collector that manages many aspects of this memory reclaiming process for the developer. For example, in the case of the MICROSOFT® NET Framework, the developer can use the Collect method (often called GC.Collect) to force a GC collection. These collections forced by the user are not always performed at the most optimal time. Furthermore, the garbage collection process can be intrusive at times when critical portions of an application are executing.

SUMMARY

Various technologies and techniques are disclosed for providing optimized garbage collection. A garbage collector is provided for managing a garbage collection process. An optimized garbage collection feature is provided that allows the garbage collection process to be suggested. When the optimized garbage collection feature is invoked at a particular moment, the system determines if collection is appropriate at the particular moment. If collection is determined to be appropriate at the particular moment, then the system performs the garbage collection process. If collection is not determined to be appropriate at the particular moment, then the system delays garbage collection until an appropriate time.

In one implementation, a low latency mode can be used to invoke a low latency process that automatically ensures that the garbage collection process starts sooner than it would in a normal mode. The latency mode that is used to set the pace for performing collections can optionally be changed at different points in time during the garbage collection process.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
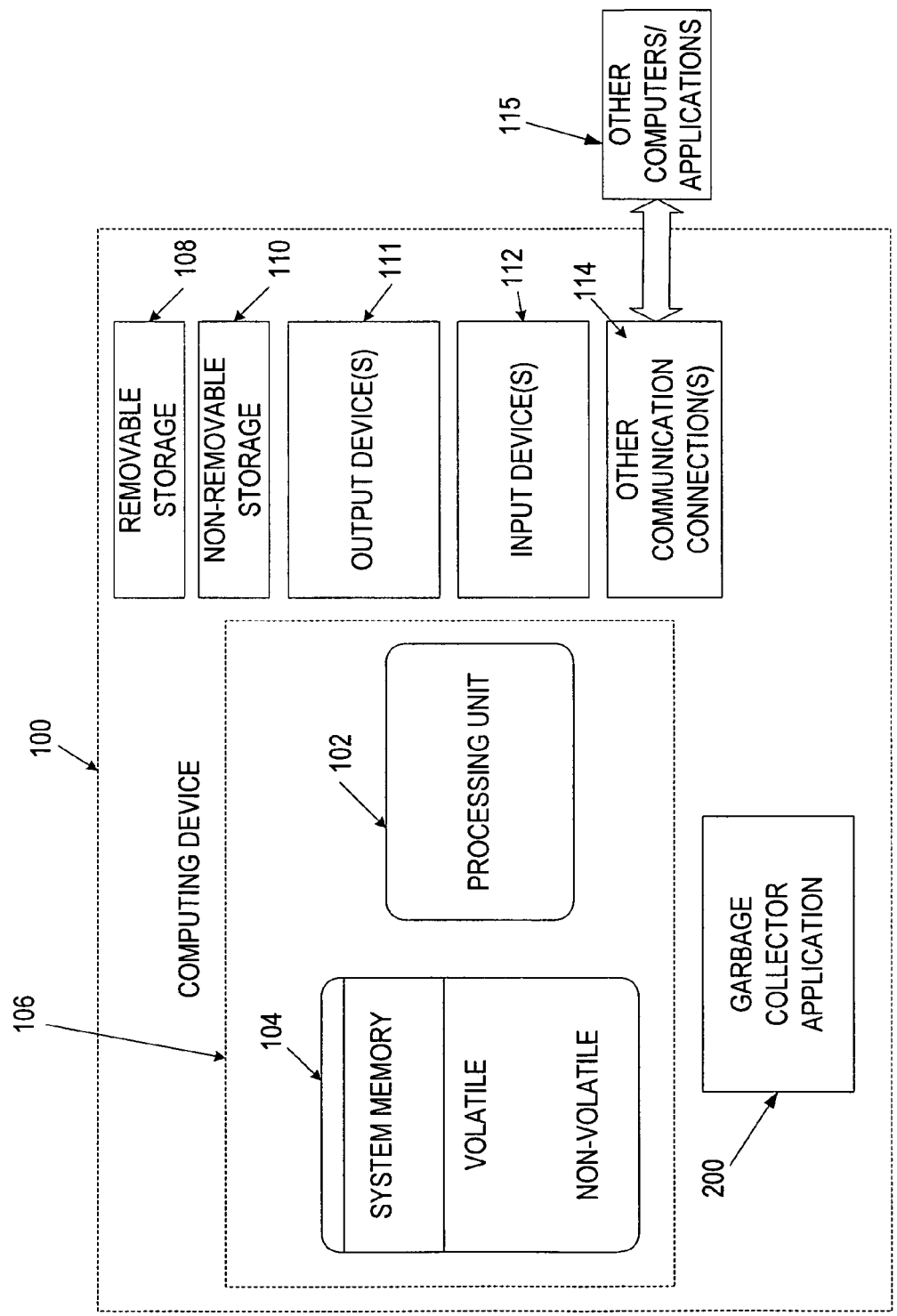
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a garbage collection system, but the system also serves other purposes in addition to these. In one implementation, one or more of the techniques described herein can be implemented as features within a framework program such as MICROSOFT® .NET Framework, or from any other type of program or service that provides platforms for developers to develop software applications.

In one implementation, an optimized garbage collection feature is provided that allows the garbage collection process to be suggested by the developer at a particular point in program execution, but not required. The decision is left up to the garbage collector on whether or not the timing is good to perform a garbage collection. In another implementation, a low latency mode can be set to automatically ensure that the garbage collection process starts sooner than it would in a normal mode (e.g. to force collection sooner so user threads will not be paused often—such as during application critical moments). The latency mode (low, batch, interactive, etc.) that is used to set the pace for performing collections can optionally be changed at different points in time during the garbage collection process.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes garbage collector application 200. garbage collector application 200 will be described in further detail in FIG. 2.

Figure 2:
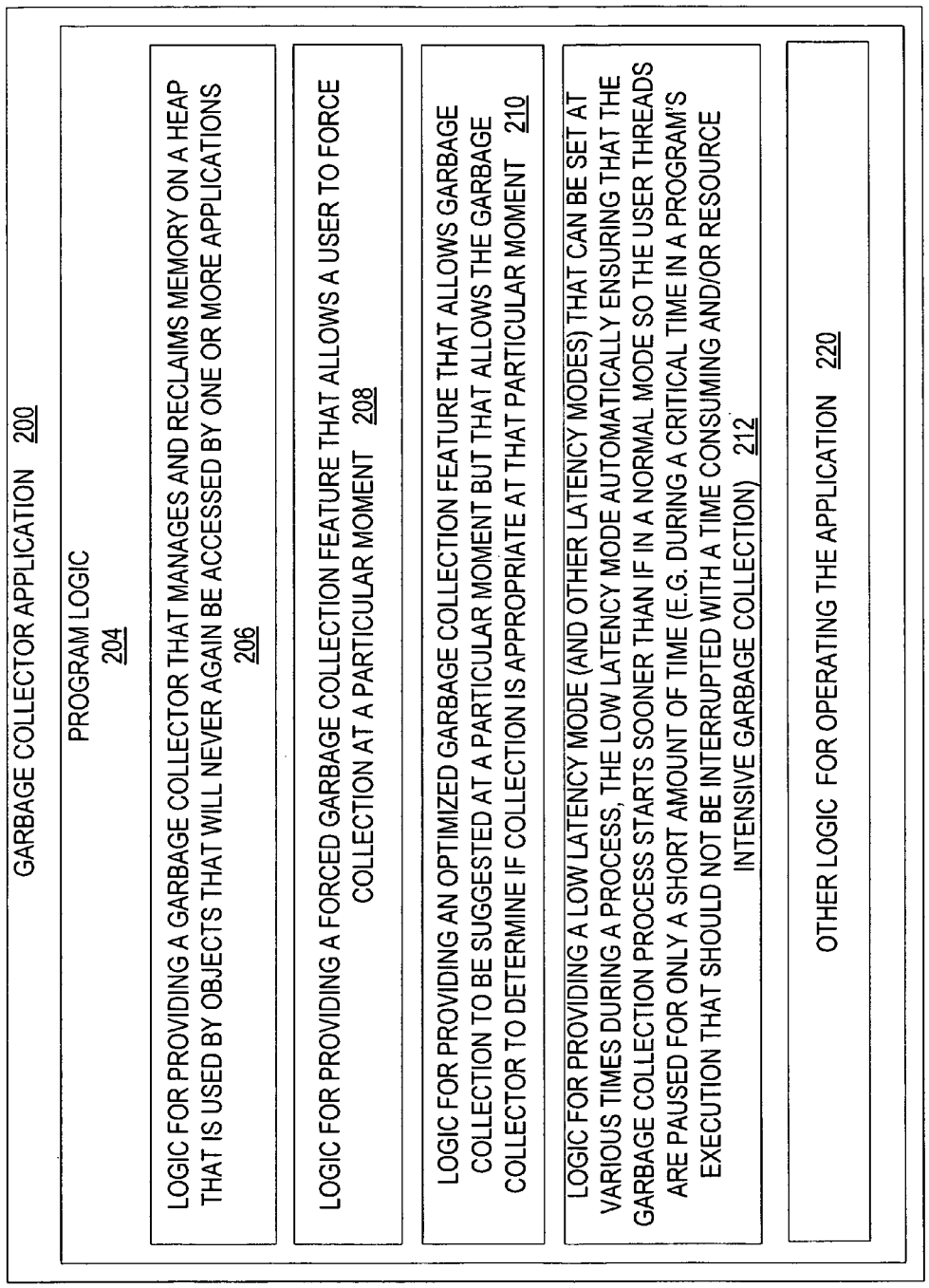
FIG. 2 is a diagrammatic view of a garbage collector application of one implementation operating on the computer system of FIG. 1.

Turning now to FIG. 2 with continued reference to FIG. 1, a garbage collector application 200 operating on computing device 100 is illustrated. Garbage collector application 200 is one of the application programs that reside on computing device 100. However, it will be understood that garbage collector application 200 can alternatively or additionally be embodied as computer-executable instructions on one or more computers and/or in different variations than shown on FIG. 1. Alternatively or additionally, one or more parts of garbage collector application 200 can be part of system memory 104, on other computers and/or applications 115, or other such variations as would occur to one in the computer software art.

Garbage collector application 200 includes program logic 204, which is responsible for carrying out some or all of the techniques described herein. Program logic 204 includes logic for providing a garbage collector that manages and reclaims memory on a heap that is used by objects that will never again be accessed by one or more applications 206; logic for providing a forced garbage collection feature that allows a user to force collection at a particular moment 208; logic for providing an optimized garbage collection feature that allows garbage collection to be suggested at a particular moment but that allows the garbage collector to determine if collection is appropriate at that particular moment 210; logic for providing a low latency mode (and other latency modes) that can be set at various times during a process, the low latency mode automatically ensuring that the garbage collection process starts sooner than if in a normal mode so the user threads are paused for only a short amount of time (e.g. during a critical time in a program's execution that should not be interrupted with a time consuming and/or resource intensive garbage collection) 212; and other logic for operating the application 220. In one implementation, program logic 204 is operable to be called programmatically from another program, such as using a single call to a procedure in program logic 204.

Figure 3:
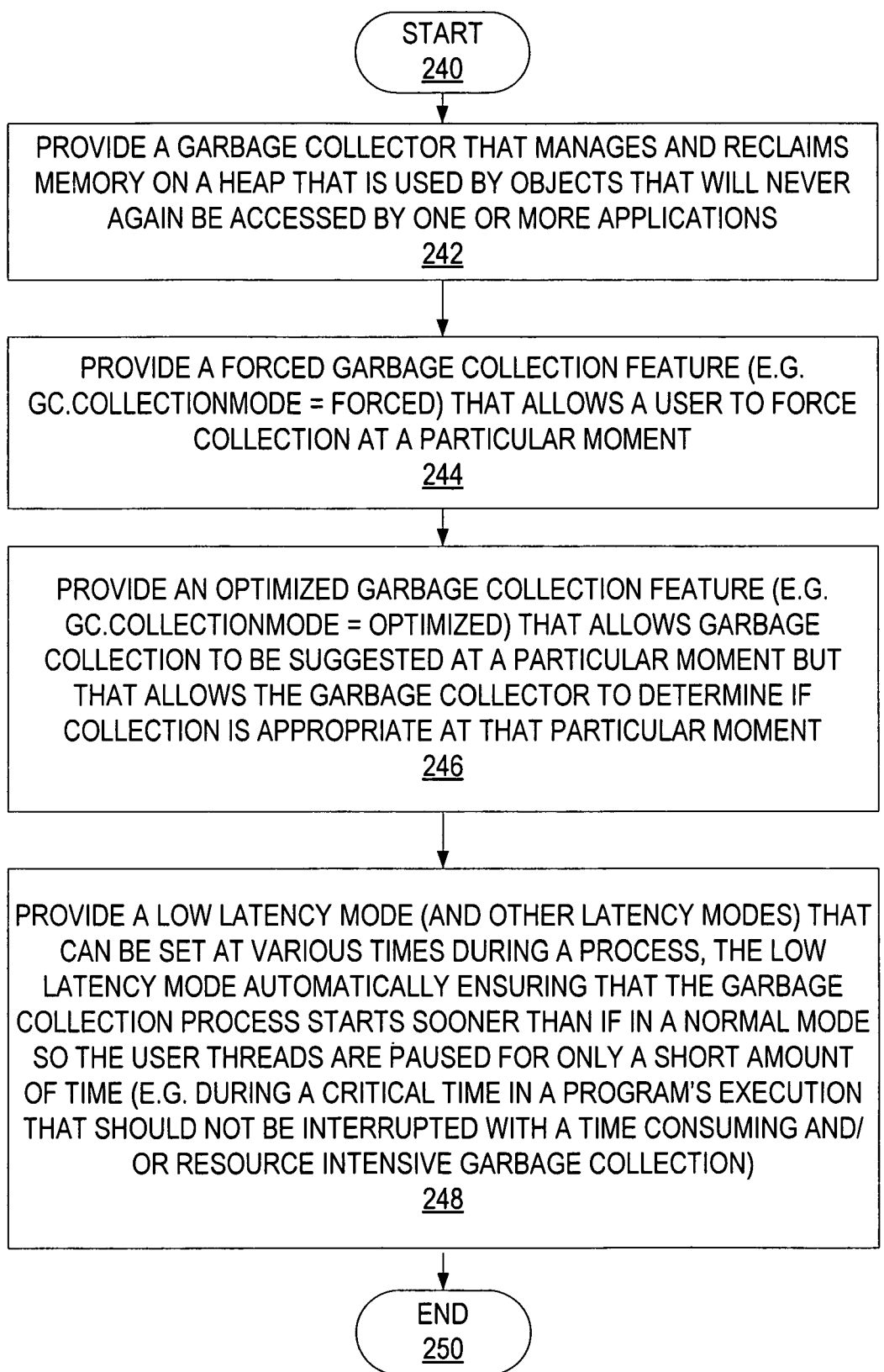
FIG. 3 is a high-level process flow diagram for one implementation of the system of FIG. 1.

Turning now to FIGS. 3-8 with continued reference to FIGS. 1-2, the stages for implementing one or more implementations of garbage collector application 200 are described in further detail. FIG. 3 is a high level process flow diagram for garbage collector application 200. In one form, the process of FIG. 3 is at least partially implemented in the operating logic of computing device 100. The stages and features described in FIG. 3 could be performed in a different order than described. Only some of the stages or features may be provided in alternate implementations. The procedure begins at start point 240 with providing a garbage collector that manages and reclaims memory on a heap that is used by objects that will never again be accessed by one or more applications (stage 242). A forced garbage collection feature is provided (e.g. GC.collectionmode=forced) that allows a user to force collection at a particular moment (stage 244). An optimized garbage collection feature is provided (e.g. GC.collectionmode=optimized) that allows garbage collection to be suggested at a particular moment but that allows the garbage collector to determine if collection is appropriate at that particular moment (stage 246). Alternatively or additionally, a low latency mode is provided that automatically ensures that the garbage collection process starts sooner than if in a normal mode so the user threads are paused for only a short amount of time (e.g. during a critical time in a program's execution that should not be interrupted with a time consuming and/or resource intensive garbage collection) (stage 248). In one implementation, the low latency mode (and other latency modes for that matter) can be set at various times during a process (stage 248). The process ends at end point 250.

Figure 4:
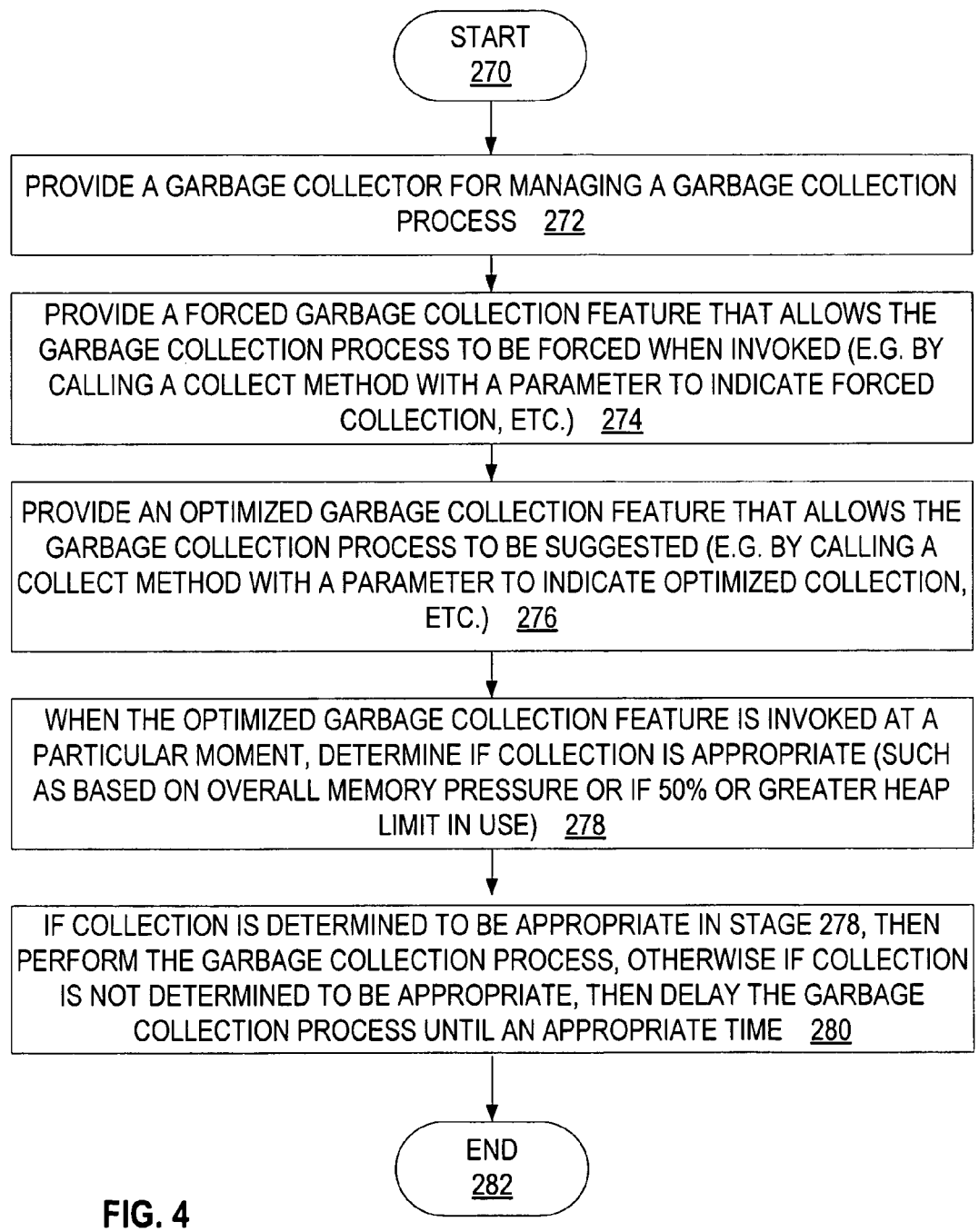
FIG. 4 is a process flow diagram for one implementation of the system of FIG. 1 illustrating the stages involved in providing garbage collection features that allow garbage collection to be suggested or forced.

FIG. 4 illustrates one implementation of the stages involved in providing garbage collection features that allow garbage collection to be suggested or forced. In one form, the process of FIG. 4 is at least partially implemented in the operating logic of computing device 100. The procedure begins at start point 270 with providing a garbage collector for managing a garbage collection process (stage 272). A forced garbage collection feature is provided that allows the garbage collection process to be forced when invoked (e.g. by calling a collect method with a parameter to indicate forced collection, etc.) (stage 274). An optimized garbage collection feature is provided that allows the garbage collection process to be suggested (e.g. by calling a collect method with a parameter to indicate optimized collection, etc.) (stage 276). When the optimized garbage collection feature is invoked at a particular moment, the system determines if collection is appropriate (e.g. such as based on overall memory pressure, or if 50% or greater heap limit in use) (stage 278). If collection is determined to be appropriate in stage 278, then the system performs the garbage collection process (stage 280). Otherwise, if collection is not determined to be appropriate, then the system delays the garbage collection process until an appropriate time (stage 280). The process ends at end point 282.

Figure 5:
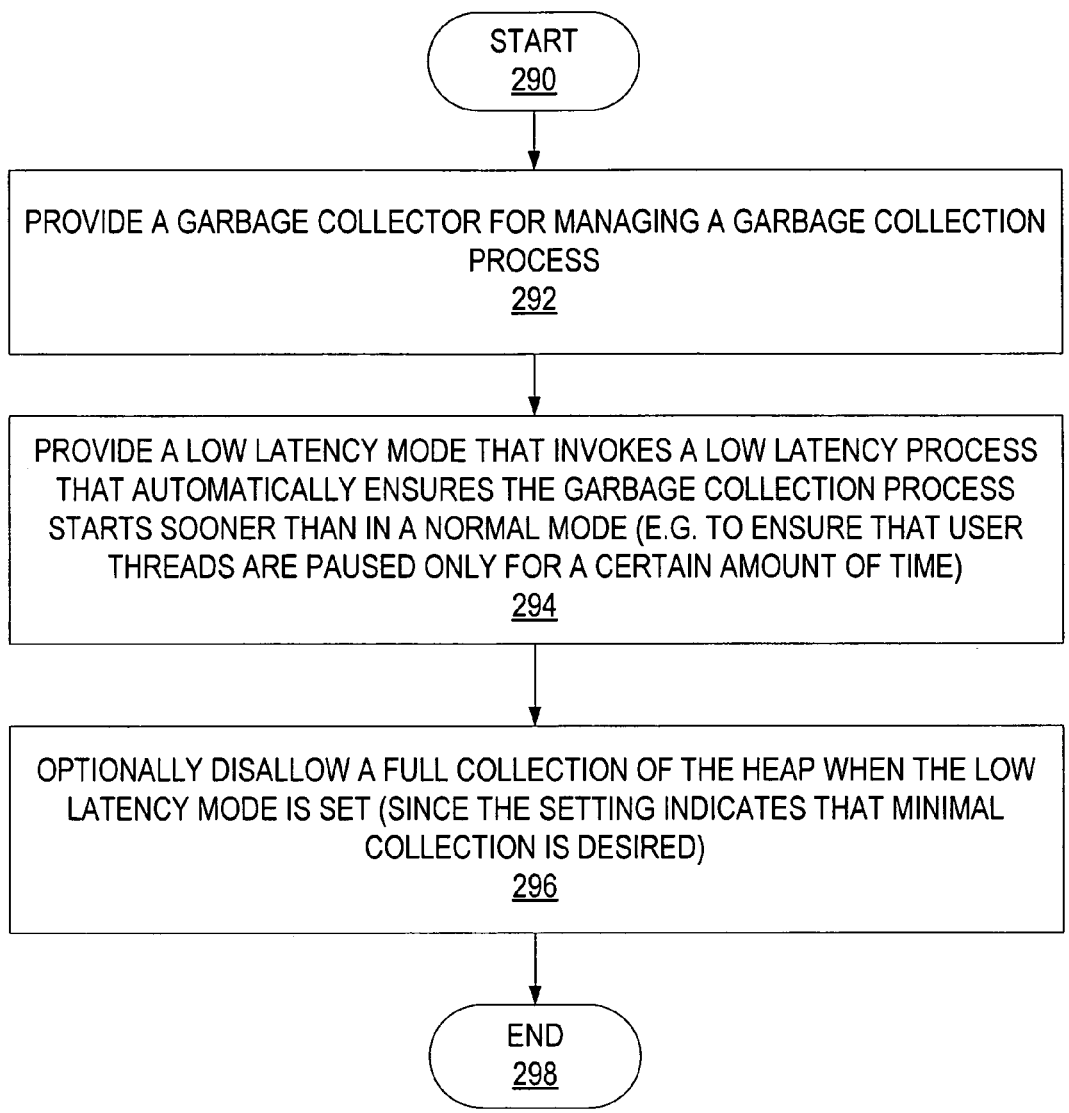
FIG. 5 is a process flow diagram for one implementation of the system of FIG. 1 illustrating the stages involved in providing a low latency mode to ensure the garbage collection process starts sooner than in a normal mode.

FIG. 5 illustrates one implementation of the stages involved in providing a low latency mode to ensure the garbage collection process starts sooner than in a normal mode. In one form, the process of FIG. 5 is at least partially implemented in the operating logic of computing device 100. The procedure begins at start point 290 with providing a garbage collector for managing a garbage collection process (stage 292). A low latency mode is provided that invokes a low latency process that automatically ensures the garbage collection process starts sooner than in a normal mode (e.g. to ensure that user threads are paused only for a certain amount of time) (stage 294). Full collection of the heap is optionally disallowed when the low latency mode is set (since the setting indicates that minimal collection is desired) (stage 296). The process ends at end point 298.

Figure 6:
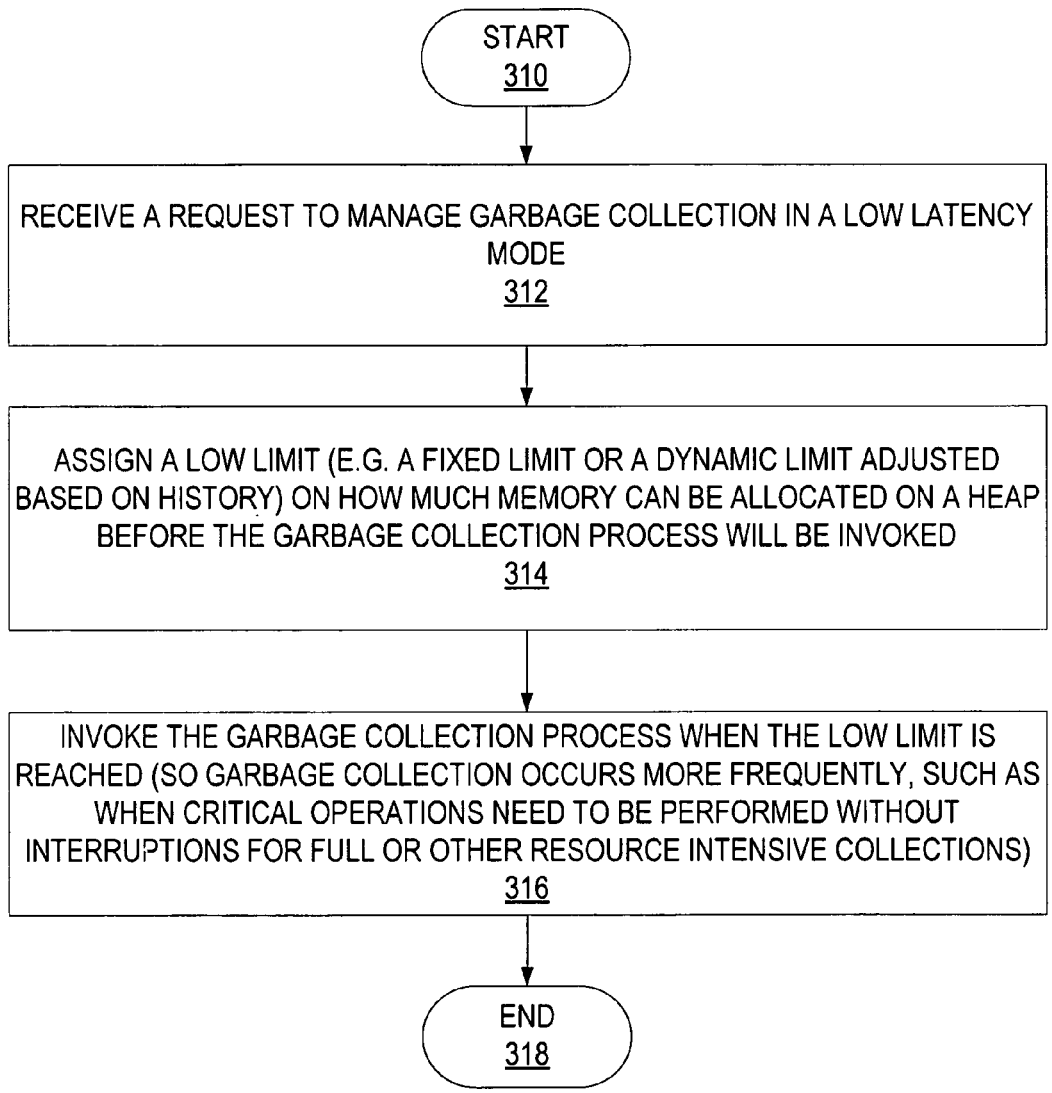
FIG. 6 is a process flow diagram for one implementation of the system of FIG. 1 illustrating the more detailed stages involved in providing a low latency mode.

FIG. 6 illustrates one implementation of the stages involved in providing a low latency mode. In one form, the process of FIG. 6 is at least partially implemented in the operating logic of computing device 100. The procedure begins at start point 310 with receiving a request to manage garbage collection in a low latency mode (stage 312). A low limit (e.g. a fixed limit or a dynamic limit adjusted based on history) is assigned based on how much memory can be allocated on a heap before the garbage collection process will be invoked (stage 314). The garbage collection process is invoked when the low limit is reached (e.g. so garbage collection occurs more frequently, such as when critical operations need to be performed without interruptions for full or other resource intensive collections) (stage 316). The process ends at end point 318.

Figure 7:
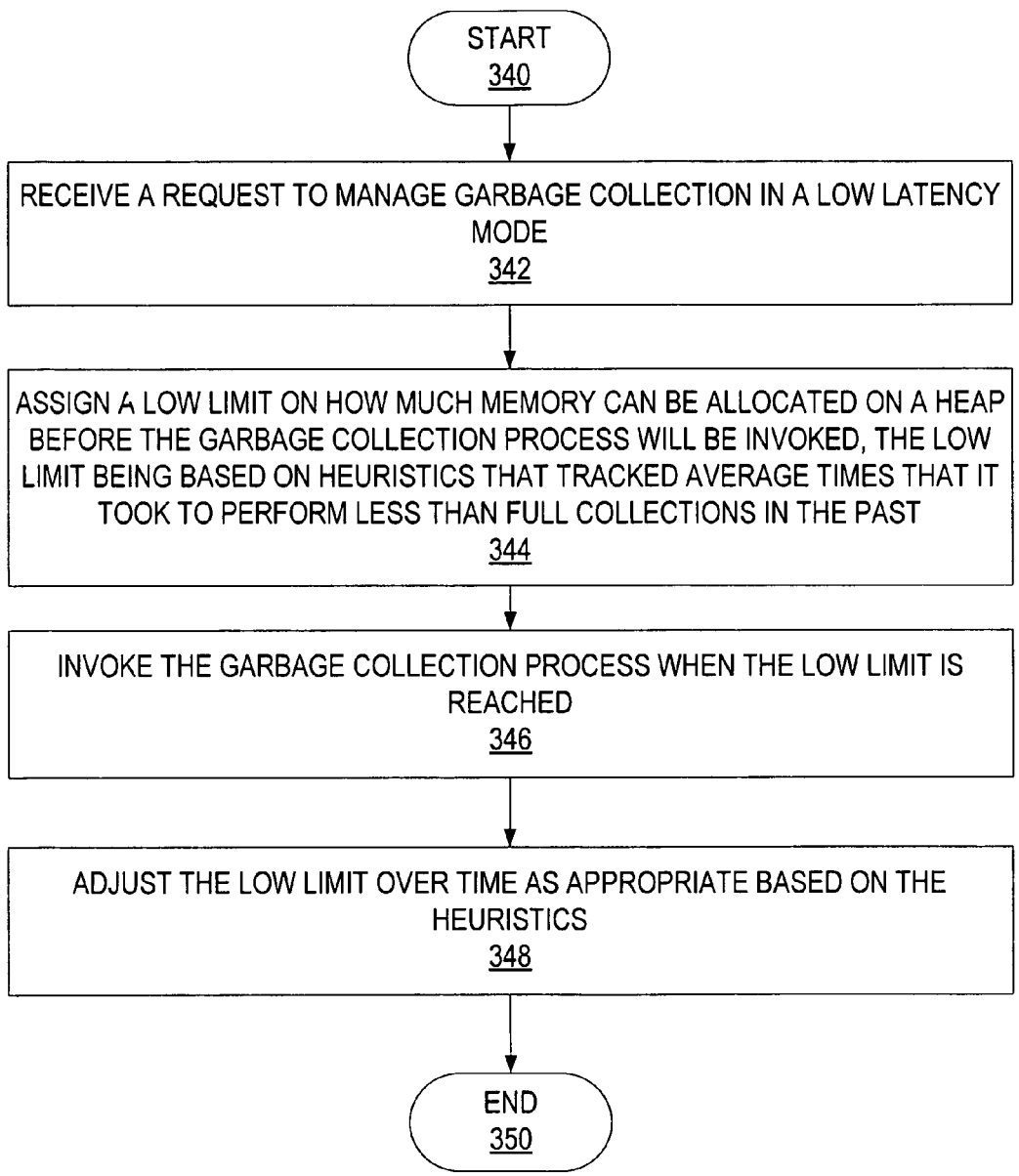
FIG. 7 is a process flow for one implementation of the system of FIG. 1 that illustrates the more detailed stages involved in adjusting limits on memory allocation with a low latency mode based on heuristics.

FIG. 7 illustrates one implementation of the stages involved in adjusting limits on memory allocation with a low latency mode based on heuristics. In one form, the process of FIG. 7 is at least partially implemented in the operating logic of computing device 100. The procedure begins at start point 340 with receiving a request to manage garbage collection in a low latency mode (stage 342). A low limit is assigned on how much memory can be allocated on a heap before the garbage collection process will be invoked (stage 344). In one implementation, the low limit is based on heuristics that tracked average times that it took to perform less than full collections in the past (stage 344). The garbage collection process is then invoked when the low limit is reached (stage 346). The low limit is adjusted over time as appropriate based in the heuristics (stage 348). The process ends at end point 350.

Figure 8:
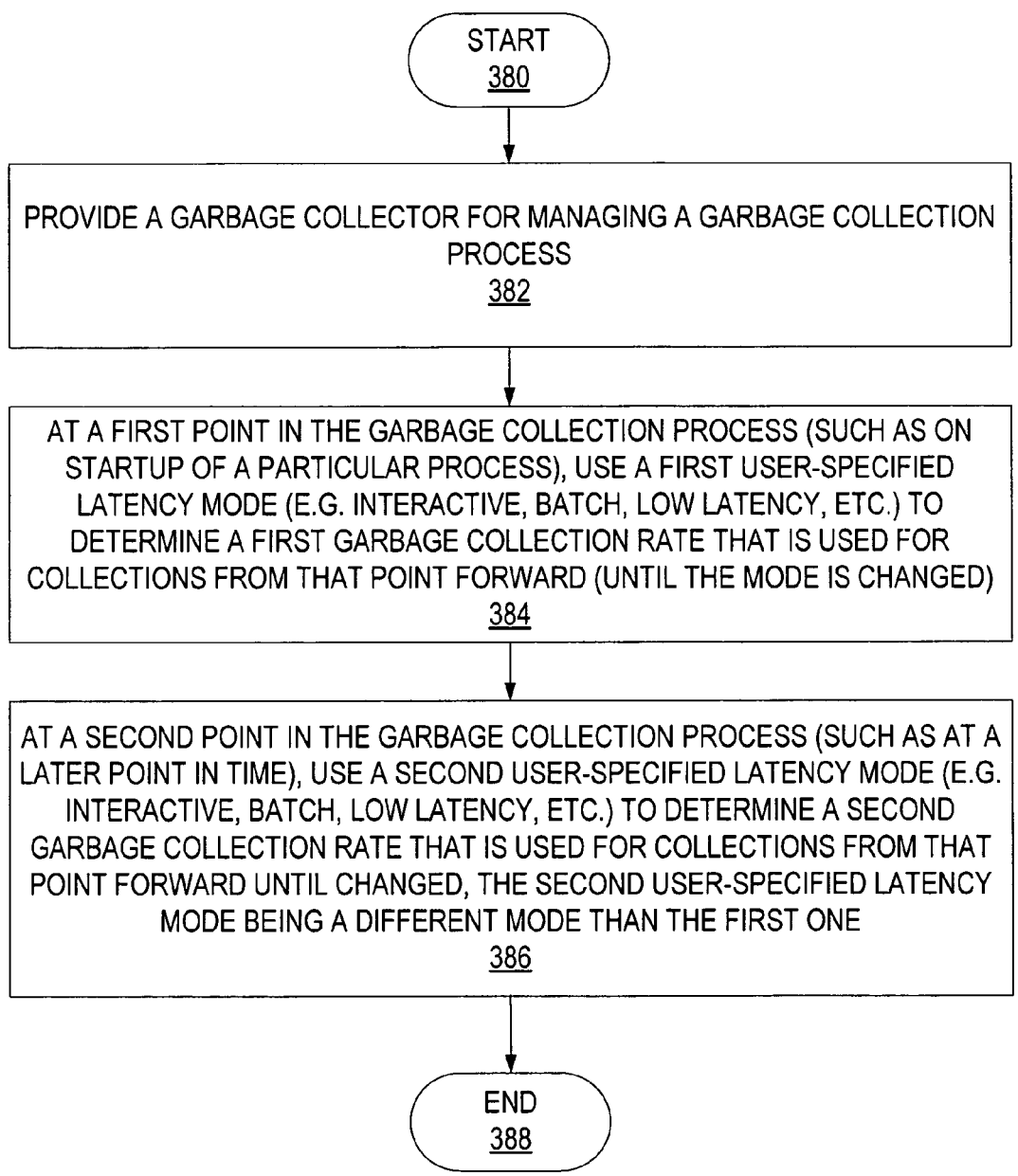
FIG. 8 is a process flow for one implementation of the system of FIG. 1 that illustrates the stages involved in allowing a user to adjust the latency modes at various points during the garbage collection process.

FIG. 8 illustrates one implementation of the stages involved in allowing a user to adjust the latency modes at various points during the garbage collection process. In one form, the process of FIG. 8 is at least partially implemented in the operating logic of computing device 100. The procedure begins at start point 380 with providing a garbage collector for managing a garbage collection process (stage 382). At a first point in the garbage collection process (such as on startup of a particular process), a first user-specified latency mode (e.g. interactive, batch, low latency, etc.) is used/retrieved to determine a first garbage collection rate that is used for collections from that point forward (until the mode is changed) (stage 384). As a second point in the garbage collection process (such as at a later point in time), a second user-specified latency mode (e.g. interactive, batch, low latency, etc.) is used/retrieved to determine a second garbage collection rate that is used for collections from that point forward until changed (stage 386). In one implementation, the second user-specified latency mode is a different mode than the first one (stage 386). The process ends at end point 388.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer-readable storage medium having computer-executable instructions for causing a computer to perform steps comprising:

provide a garbage collector for managing a garbage collection process;

provide an optimized garbage collection feature that allows the garbage collection process to be suggested by a program other than the garbage collector at a particular point in execution of the program; and when the optimized garbage collection feature is invoked at a particular moment, determine by the garbage collector if collection is appropriate at the particular moment, and if collection is determined to be appropriate at the particular moment, then performing the garbage collection process.

2. The computer-readable storage medium of claim 1, further having computer-executable instructions for causing a computer to perform the step comprising:

when the optimized garbage collection feature is invoked, if collection is determined to not be appropriate at the particular moment, then delaying the garbage collection process until an appropriate time.

3. The computer-readable storage medium of claim 1, wherein the optimized garbage collection feature is operable to be accessed by calling a collect method with a parameter that indicates optimized collection is desired.

4. The computer-readable storage medium of claim 1, further having computer-executable instructions for causing a computer to perform the step comprising:

provide a forced garbage collection feature that allows the garbage collection process to be forced when invoked.

5. The computer-readable storage medium of claim 4, wherein the forced garbage collection feature is operable to be accessed by calling a collect method with a parameter that indicates forced collection is desired.

6. The computer-readable storage medium of claim 1, wherein collection is determined to be appropriate if at least a particular percentage of a heap limit is in use.

7. The computer-readable storage medium of claim 1, wherein the particular percentage is at least fifty percent.

8. The computer-readable storage medium of claim 7, wherein the particular percentage is at least seventy percent.

9. The computer-readable storage medium of claim 1, wherein appropriateness of collection is determined based upon an overall memory pressure.

10. A computer-implemented method for providing a low latency garbage collection mode comprising the steps of:

providing a garbage collector for managing a garbage collection process; and providing a low latency mode that invokes a low latency process that automatically ensures that the garbage collection process managed by the garbage collector starts sooner than in a normal mode, the low latency mode that automatically ensures that the garbage collection process starts sooner than in the normal mode specified by a program other than the garbage collector at a particular point in execution of the program.

11. The method of claim 10, wherein the low latency process ensures that user threads are paused for only a certain amount of time.

12. The method of claim 10, further comprising:

when the low latency mode is set, disallowing a full collection of a heap to be performed.

13. The method of claim 10, wherein the low latency process comprises:

assigning a low limit on how much memory can be allocated on a heap before the garbage collection process will be invoked; and invoking the garbage collection process when the low limit is reached.

14. The method of claim 13, wherein the low limit is a fixed limit.

15. The method of claim 13, wherein the low limit is adjusted over a period of time based on a garbage collection history.

16. The method of claim 13, wherein the low limit is adjusted using heuristics that track average times for performing a less than full collection.

17. A computer-readable storage medium having computer-executable instructions for causing a computer to perform the steps recited in claim 10.

18. A computer-implemented method for changing garbage collection latency modes comprising the steps of:
   providing a garbage collector for managing a garbage collection process;
   at a first point in the garbage collection process, using a first user-specified latency mode to determine a first garbage collection rate of the garbage collector, the first user-specified latency mode to determine the first garbage collection rate specified by a program other than the garbage collector at a particular point in execution of the program; and
   at a second point in the garbage collection process, using a second user-specified latency mode to determine a second garbage collection rate of the garbage collector, the second user-specified latency mode being a different latency mode than the first user-specified latency mode, the second user-specified latency mode to determine the second garbage collection rate specified by the program at another particular point in program execution.

19. The method of claim 18, wherein the first and second latency modes are selected from the group consisting of a batch mode, an interactive mode, and a low latency mode.

20. A computer-readable storage medium having computer-executable instructions for causing a computer to perform the steps recited in claim 18.

* * * * *